United States Patent
Menne et al.

(10) Patent No.: US 6,522,251 B1
(45) Date of Patent: Feb. 18, 2003

(54) METHOD AND APPARATUS FOR SECURING AN EARTH MOVING MACHINE

(75) Inventors: James R. Menne, Morton, IL (US); Daniel C. Wood, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 102 days.

(21) Appl. No.: 09/589,261

(22) Filed: Jun. 7, 2000

(51) Int. Cl.[7] .............................................. G08B 21/00
(52) U.S. Cl. ........................ 340/540; 340/541; 340/542
(58) Field of Search ................................. 340/540, 542, 340/425.5, 543, 426, 430, 5.1, 5.2, 5.23, 5.24, 825.5, 10.42, 10.52

(56) References Cited

U.S. PATENT DOCUMENTS

| | | | |
|---|---|---|---|
| 4,649,272 A | 3/1987 | Lipschutz ................... 250/229 |
| 4,835,407 A | 5/1989 | Kataoka et al. ............ 307/10.5 |
| 4,852,680 A | 8/1989 | Brown et al. ................. 419/23 |
| 4,918,955 A | 4/1990 | Kimura et al. ................ 70/277 |
| 4,926,332 A | 5/1990 | Komuro et al. ............... 701/36 |
| 5,079,435 A | 1/1992 | Tanaka ....................... 307/10.2 |
| 5,543,665 A | 8/1996 | Demarco ..................... 340/5.6 |
| 5,610,574 A * | 3/1997 | Mutoh et al. ................ 340/426 |
| 5,646,456 A | 7/1997 | Udoh et al. ................. 307/10.5 |
| 5,670,933 A | 9/1997 | Hayashi ...................... 340/426 |
| 5,675,490 A | 10/1997 | Bachhuber ................... 701/32 |
| 5,679,984 A | 10/1997 | Talbot et al. ............... 307/10.3 |
| 5,682,135 A | 10/1997 | Labonde ..................... 340/426 |
| 5,684,454 A | 11/1997 | Nishioka et al. ............ 340/426 |
| 5,686,883 A | 11/1997 | Mutoh et al. ................ 340/426 |
| 5,693,987 A | 12/1997 | Krucoff ...................... 307/10.2 |
| 5,699,685 A | 12/1997 | Jahrsetz et al. .............. 70/264 |
| 5,708,308 A | 1/1998 | Katayama et al. .......... 307/10.5 |
| 5,734,330 A | 3/1998 | Nakamura ................. 428/411.1 |
| 5,745,026 A | 4/1998 | Kokubu et al. ......... 340/286.01 |
| 5,774,043 A * | 6/1998 | Mizuno et al. .............. 340/426 |
| 5,774,065 A | 6/1998 | Mabuchi et al. ........ 340/825.72 |
| 5,796,178 A | 8/1998 | Onuma ....................... 307/10.2 |
| 5,796,329 A | 8/1998 | Bachhuber ................... 340/426 |
| 5,811,885 A | 9/1998 | Griessbach ................. 340/5.64 |
| 5,818,330 A | 10/1998 | Schweiger ................... 340/426 |
| 5,844,495 A | 12/1998 | Griessbach ................. 340/5.26 |
| 5,886,421 A | 3/1999 | Mizuno et al. ............ 307/10.5 |
| 5,897,598 A | 4/1999 | Puetz ......................... 340/5.27 |
| 5,912,512 A * | 6/1999 | Hayashi et al. ............ 307/10.5 |
| 5,969,633 A * | 10/1999 | Rosler ................... 340/825.34 |
| 6,144,113 A * | 11/2000 | Hayashi et al. ............ 307/10.5 |

FOREIGN PATENT DOCUMENTS

| | | |
|---|---|---|
| DE | 4338106 | 5/1995 |
| DE | 19601816 | 7/1997 |
| DE | 19812210 | 5/1999 |
| EP | 0 857 629 A2 | 8/1998 |
| EP | 1059212 | 12/2000 |
| WO | WO 99/44869 | 9/1999 |

\* cited by examiner

*Primary Examiner*—Daniel J. Wu
*Assistant Examiner*—Son Tang
(74) *Attorney, Agent, or Firm*—W Bryan McPherson; Kelsey L Milman

(57) ABSTRACT

The present invention includes a method and apparatus to secure a machine having a machine security system. The machine security system includes a primary controller, and a key switch associated with the primary controller and adapted to receive a key, the key switch being configurable to a plurality of positions. The method includes the steps of delivering power to the primary controller in response to the key switch being configured in a predetermined position, activating the security system in response to the power delivery, determining a first operating characteristic of the machine, determining whether to maintain activation of the security system in response to the first operating characteristic, receiving an identification code from the key, and determining whether to enable machine operation in response to the received key code.

38 Claims, 4 Drawing Sheets

20
METHOD AND APPARATUS FOR SECURING AN EARTH MOVING MACHINE

TECHNICAL FIELD

The present invention relates generally to the operation of an earth moving machine, and more particularly, to a method and apparatus for securing an earth moving machine.

BACKGROUND ART

Machine security systems are increasing in complexity to overcome the efforts aimed at stealing the machines. While increased functionality is needed in a machine security system, the system needs to be easy to operate and maintain. In a work environment such as a construction site, or a mine, there may be periods of time when the machine security system is preferably deactivated to enable easy access of multiple people to the machine during normal working hours. After normal working hours the security system may be preferably activated such that access to the machine requires a special authorization.

In addition, it may be desirable to provide someone access to the machine, via the security system, for a period of time or function of machine usage. For example, the owner of a rental fleet may want to enable a rentor to have access to the machine during the duration set forth in the rental agreement, and restrict access otherwise.

The present invention is directed to overcome one or more of the problems set forth above.

DISCLOSURE OF THE INVENTION

In one aspect of the present invention, a method of securing an earth moving machine having a machine security system is disclosed. The machine security system includes a primary controller and a key switch associated with the primary controller. The key switch is adapted to receive a key, and is configurable to a plurality of positions. The method comprises the steps of delivering power to the primary controller in response to the key switch being configured in a predetermined position, activating the security system in response to the power delivery, receiving an identification code from the key in response to the security system remaining active, and determining whether to enable operation of the machine in response to the key code.

In another aspect of the present invention, a method of securing a machine having a machine security system is disclosed. The machine security system includes a primary controller, and a key switch associated with the primary controller. The key switch is adapted to receive a key and is configurable to a plurality of positions. The method comprises the steps of delivering power to the primary controller in response to the key switch being configured in a predetermined position, activating the security system in response to the power delivery, determining whether to maintain activation of the security system, receiving an identification code from the key in response to the security system remaining active, determining whether to enable operation of the machine in response to the identification code.

In yet another aspect of the present invention, a security apparatus adapted to secure an earth moving machine is disclosed. The apparatus comprises a key switch adapted to receive a key, the key switch having a plurality of positions, a power source for delivering a power signal, an antenna adapted to receive a key identification code signal, and responsively generate a received key identification signal, a primary controller adapted to receive the power signal in response to the key switch being configured in a predetermined position, the primary controller adapted to receive the key identification signal, the primary controller including at least one key identification code, the primary controller being further adapted to activate the security system in response to receiving the power signal, determine whether to maintain activation of the security system, determine whether to enable machine operation in response to the identification code comparison.

In yet another aspect of the present invention, a method of securing a machine having a machine security system is disclosed. The machine security system includes a primary controller, and a key switch associated with the primary controller. The key switch is adapted to receive a key and is configurable to a plurality of positions. The method comprises the steps of delivering power to the primary controller in response to the key switch being configured in a predetermined position, activating the security system in response to the power delivery, determining whether to enable machine operation, receiving an identification code from the key in response to the security system remaining active, determining whether to enable operation of the machine in response to the identification code.

In yet another aspect of the present invention, a method of securing a machine having a machine security system is disclosed. The machine security system Includes a primary controller, and a key switch associated with the primary controller. The key switch is adapted to receive a key and is configurable to a plurality of positions. The method comprises the steps of delivering power to the primary controller in response to the key switch being configured in a predetermined position, activating the security system in response to a first operating characteristic, determining whether to maintain activation of the security system, receiving an identification code from the key in response to the security system remaining active, determining whether to enable operation of the machine in response to the identification code.

BEST MODE FOR CARRYING OUT THE INVENTION

Figure 1:
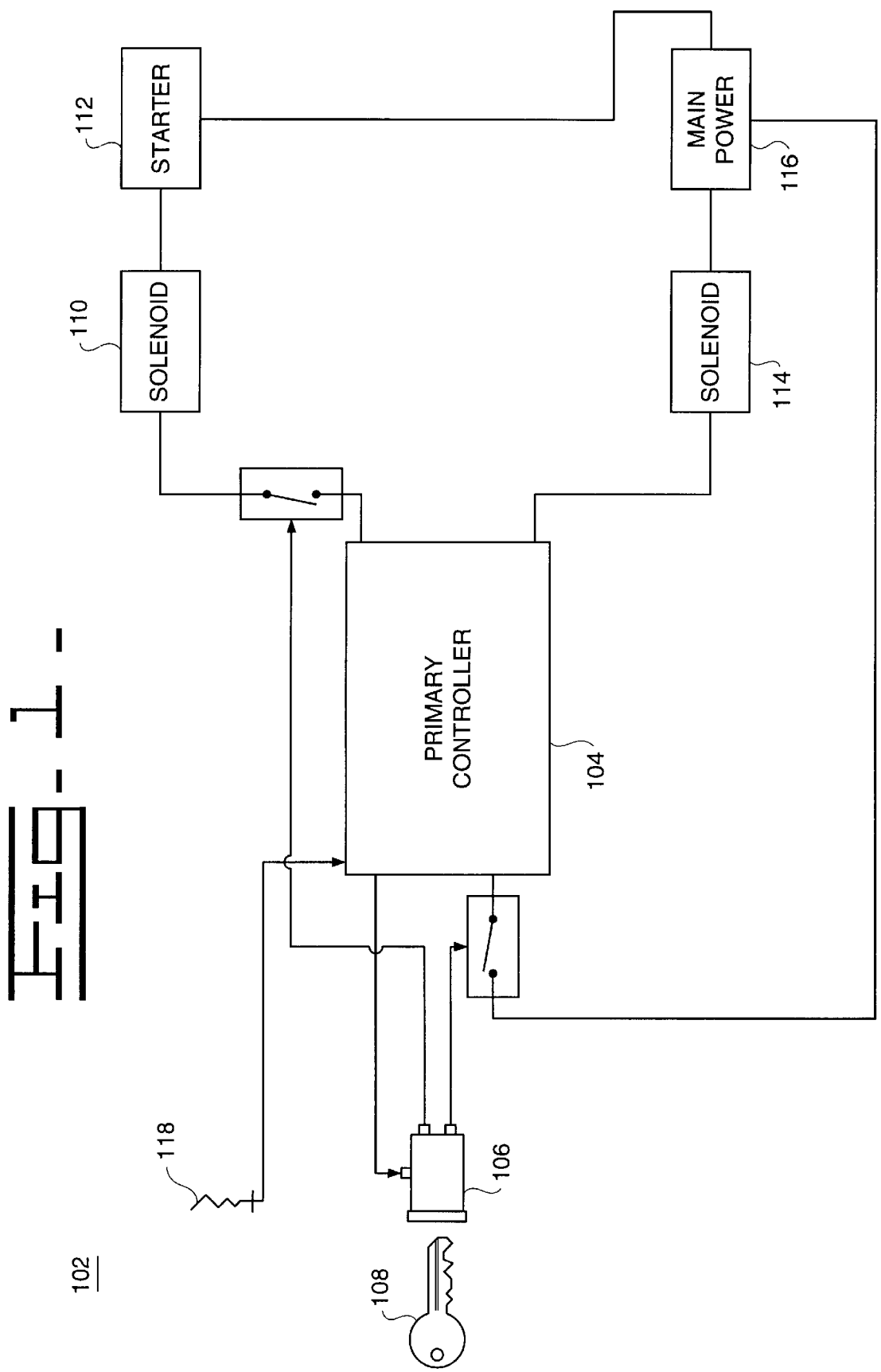
FIG. 1 is an illustration of one embodiment of a machine security system.

The present invention provides a method and apparatus to secure a machine. FIG. 1 is an illustration of one embodiment of a machine security system 102. In the preferred embodiment, the machine security system 102 is located on an earth moving machine, however, the invention is equally applicable to other applications and machines such as generator sets, pumps, and stationary and marine engine applications.

The security system 102 includes a key switch 106 adapted to receive a key 108. The key switch 106 has a plurality of positions that it may be configured, or placed in. For example, in one embodiment, the key switch 106 has an "OFF", "ON", and "STAPT" position. The key switch 106 may also include an accessory position. The key switch 106 may be manipulated from one position to the next by inserting and turning the key 108. That is, the key switch 106 is configured in an "OFF" position prior to receiving the key 108. Once the key 108 is inserted, the key 108 and corresponding key switch 106 may be rotated, such that the key switch 106 is rotated between the "OFF", "ON", and "START" position. In one embodiment, power may be delivered to the primary controller 104 when the key switch 106 is rotated to the "ON" position. In addition, if the appropriate security measures are satisfied, the engine may be started when the key switch 106 is rotated to the "START" position.

The key switch 106 may be manipulated by a key 108. As will be described below, the key may be either a non-electronic key, or an electronic key. In one embodiment, an electronic key is adapted to receive a polling signal from the machine security system 102, and responsively generate an identification code signal. However, other methods of interaction between the key 108 and the security system 102 are possible such that the electronic key generates an identification code. In the preferred embodiment the identification code of an electronic key 108 is specific to that key 108. In addition one or more electronic keys may include a master identification code. The master identification code indicates the associated key 108 is a master key. The master key provides the user additional capabilities, as will be discussed below. In one embodiment, the key 108 may be a universal machine key. That is the key may be able to operate multiple machines of the same make or model of a manufacturer. In one embodiment, there may be multiple universal keys. Again, the universal machine key may be either an electronic, or non-electronic key.

The security system 102 also includes an antenna 118 adapted to receive the identification code signal generated by the key 108. In the preferred embodiment, the antenna 118 is associated with the key switch 106. The antenna 118 generates a received key identification code signal in response to receiving the identification code signal.

The security system 102 includes a primary controller 104. In one embodiment, the primary controller 104 is adapted to: activate the security system 102 in response to receiving power, determine a first operating characteristic of the machine, determine whether to maintain activation of the security system 102 in response to the first operating characteristic, receive the key identification code signal, and determine whether to enable operation of the machine in response to the key code.

The primary controller 104 may include one or more authorized key codes. In the preferred embodiment, the primary controller 104 includes a plurality of authorized key codes located in an access key list. The access key list preferably includes a list of each of the key identification codes that have been approved to enable machine operation. For example, the key codes are associated with electronic keys that have been approved to disarm the security system 102 when the security system 102 is active. In the preferred embodiment, the primary controller 104 will include additional information, such as an access level associated with each key. For example, the access level may be either user or master user. A master user access level, associated with a master key, enables the user to have additional privileges regarding the machine security system 102. The additional privileges may include, for example, the ability to modify the access list, e.g., to add/delete/modify key identification codes. The primary controller 104 may also include a key activation period associated with each key identification code, which will be described below. The access list is one embodiment of storing the authorized key codes. Other forms of list or maps may also be used.

The security system 102 may interact with a starter 112 adapted to start the engine (not shown) of the machine. In the preferred embodiment, the starter is energized by a solenoid 110. Alternatively, other devices, such as a relay may be used to energize the starter 112. In one embodiment, the solenoid 110 energizes the starter 112 in response to a signal received from the primary controller 104, e.g., one the appropriate security measures have been satisfied. Alternatively the solenoid 110 may receive power when the primary controller 104 does, and the starter 112 may be energized by the solenoid 110 when the key switch 106 is placed in the "START" position. However, in this case, the machine will not start until the security measures performed by the security system 102 have been satisfied.

Figure 3:
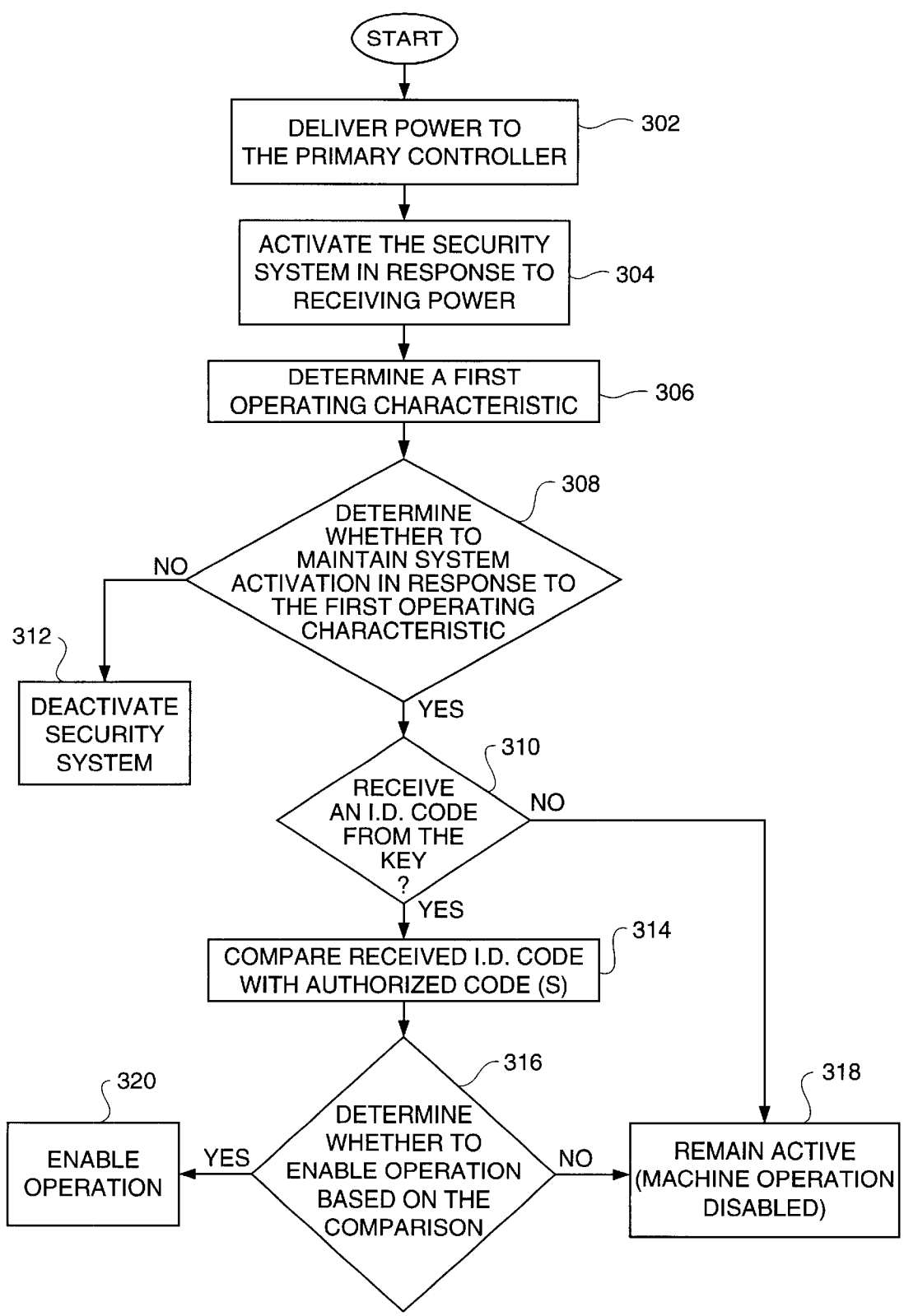
FIG. 3 is an illustration of one embodiment of a method of securing an earth moving machine having a machine security system.

FIG. 3 illustrates one embodiment of the method of the present invention. The present invention includes a method of securing a machine having a machine security system 102. In a first control block 302 power is delivered to the primary controller 104 in response to the key switch 106 being configured in a predetermined position. In the preferred embodiment, the key switch 108 is placed in the "ON" position from the "OFF" position. Once the key switch 106 is placed in the "ON" position, a connection between the primary controller 104 and the power source 116 is closed, thereby providing power to the primary controller 104. In a second control block 304, the security system 102 is activated in response to the primary controller 104 receiving power. In the preferred embodiment, until the security system 102 is deactivated, or disarmed, as will be discussed below, the machine may not be operated. Therefore, when the primary controller 104 receives power, the security system 102 is initialized in a manner that will prevent the machine from being operated, i.e., the security system 102 is activated.

In a third control block 306 a first operating characteristic of the machine is determined. In the preferred embodiment, the first operating characteristic of the machine is time of day. However, other characteristics could be determined including one or more of the following: day of the week, date, or service hours, or other machine operating characteristics. Service hours is one indication of duration of machine operation. In one embodiment, service hours may be obtained from a service hour meter. The first operating characteristic may be used to determine whether to enable operation of the machine. For example, in one embodiment, in a first decision block 308, a determination is made as to whether the security system 102 should remain activated in response to the first operating characteristic. If the security system 102 remains activated, the machine is prevented from being operated, unless additional security measures are satisfied, as will be described below. However, if the determination is made that the security system 102 should not remain activated, in response to the first operating characteristic, then the system 102 is deactivated, and machine operation is enabled. In the preferred embodiment, if the security system 102 is deactivated, then the machine may be started with either an electronic key, or a non-electronic key.

In one embodiment, in order to determine if the security system 102 should remain activated, the first operating characteristic may be compared to a system activation period. A system activation period is an operating condition during which the security system 102 is desired to be activated. In one embodiment, the system activation period is a time period. In a construction site, for example, normal, or desired hours of operation may be from eight in the morning to five in the afternoon. For easy access to the machine, the construction site may desire to deactivate the security system 102 during the desired time of normal operation, and activate the system 102 during the other time period (the system activation period). In an alternative embodiment, the system activation period may include an indication of the service hours, or operating time of the machine. For example, a user who has rented the machine, may have access to the machine for a period of time based upon a number of days, or the number of service hours the machine is operated. In this example, the system activation period may vary over time. For example, if the machine was leased for a specified number of service hours, then during one time period, e.g., until the agreed upon service hours have been utilized, the system activation period may be from five in the afternoon to eight in the morning, deactivating the system 102 during normal hours of operation. However after the first time period, e.g., the authorized number of service hours have been utilized, the system activation period may change, e.g., extend to twenty four hours a day, such that an authorized electronic key is required to enable the machine to operate, as described below. That is, once the authorized service hours have been utilized, the security system 102 remains active whenever the primary controller 104 is powered, thereby enabling machine operation to occur only with an authorized electronic key. Accordingly, the system activation period is configurable to support the user's needs.

Therefore, with reference to the decision block 308, in the preferred embodiment, the first operating characteristic, e.g., one or more of the time of day, date, and/or service hours, is compared with the user configurable system activation period. If the first operating characteristic is within the system activation period then the security system 102 remains active, and control passes to a second decision block 310. If the first operating characteristic is not within the system activation period then the security system 102 is deactivated and control passes to a fourth control block 312.

In the fourth control block 312 the security system 102 is deactivated, and the machine may be enabled to operate, using either an electronic or non-electronic key. Once deactivated, the system 102 delivers an enable signal to the starter solenoid 110 and to the main power solenoid 114. In the deactivated state, once the key switch 106 is placed in the "START" position, a contact is formed between the primary controller 104 and the starter solenoid 110 such that the solenoid 110 energizes the starter 112 upon receipt of the enable signal.

If the security system 102 remains active, then control proceeds to a second decision block 310. In the second decision block 310, an identification code is received from the key 108. In the preferred embodiment, a polling signal is generated by the primary controller 104 in response to the security system 102 remaining active. The polling signal is generated to prompt an electronic key 108 to generate an identification code signal. The polling signal may be a pulsed signal which is delivered to a coil (not shown) located in the key switch 106. The coil is magnetically coupled to electronic circuitry (not shown) in the key 108. Therefore, the pulsed signal may energize the circuitry in the key 108, and a transponder (not shown) located in the key 108 generates a key identification code signal, in response to the polling signal. The key identification code is delivered to the primary controller 104 via the antenna 118.

In one embodiment, a data validity check is performed on the identification code signal to ensure the data received is valid, e.g., not corrupted with noise. One technique of performing data validity is checking the parity bit of the received messages. In the preferred embodiment, the primary controller 104 polls the key 108 until three consecutive identification signals are received containing valid data. If three consecutive valid data signals are not received after a period of time, or a predetermined number of polling attempts, then the reading of the key 108 is determined to have failed, control proceeds to a fifth control block 318, and the security system 102 remains activated. Alternatively, the received data may be used without validity checks, the first valid data signal may be used, or some variation thereof of number of valid data signals needed to be received before determining valid data was received. In addition, in one embodiment, even if data validity checks are used, if the data is not validated, control may proceed to a sixth control block 314 to compare the received identification code, containing valid data or otherwise. In this manner, even if invalid data is received, the received identification code will not match the codes located on the access list.

Once an identification code is received from the electronic key 108, a determination is made whether to enable machine operation in response to the received key code. For example, if the key code is an appropriate code, machine operation may be enabled. In one embodiment, the control proceeds to a sixth control block 314, and the key identification code is compared with the authorized key identification code(s) stored on the primary controller 104. The received key identification code is compared with the stored authorized key code(s) to determine if the received code may be matched. In one embodiment each authorized key code may have an associated key activation period. Alternatively one key activation period may be associated with multiple authorized key codes. The key activation period may be indicative of an operating characteristic during which the key identification code is authorized to operate the machine, e.g., period of time, day of the week, date, or service hours. Therefore, a second operating characteristic may be established and compared with the key activation period of the associated key code. The second operating characteristic may include one or more of the following: the current time, day of the week, date, or service hours of the machine. In addition, the second operating characteristic may be the same as the first operating characteristic. If the second operating characteristic falls within the key activation period, then machine operation may be enabled.

For example, a dealer may rent a machine to an end-user. The dealer may provide the user with one or more electronic keys and non-electronic keys. In one embodiment, the dealer may configure the access list such that the electronic keys are only authorized for the duration of the rental agreement. For example, if the rental agreement is for a one month period, e.g., June 1–June 30th, then, on July 1st, the key identification code will match with an access key code, but the current time or date, July 1st, is outside the key activation period June 1–30th. In addition, the key activation period may be for a number of hours, e.g., eight to midnight, during the work week, or even a designated number of service hours, where the service hour is an indicator of the amount of time the machine has been operated. For example, the key activation period may last for 1000 service hours, starting from an activation date, until the machine has been operated for the designated number of hours. In addition, the key activation period may be a combination of the above characteristics. In the preferred embodiment, the key activation period is specific to a key identification code. However the same activation period may apply to multiple key identification codes on the access list.

Therefore, in a third decision block 316, a determination is made regarding whether to enable operation of the machine in response to the comparison of the received key identification code with the authorized key identification code(s) stored on the primary controller 104. If the security measures are satisfied, e.g., the received key identification code is correlated with an authorized code, then control passes to a seventh control block 320, and machine operation may be enabled. In one embodiment, as mentioned, machine operation may be enabled if the access list includes the key identification code, and an established second operating characteristic is compatible with the key activation period associated with the key identification code. If either the received identification code is not on the access list, or the second operating characteristic is not compatible with the key activation period, key verification fails, control proceeds to a fifth control block 318, the security system 102 remains activated, and the machine may not be operated.

In one embodiment, if the security system 102 remains active in response to the first operating characteristic, and the additional security measures are complied with, e.g., the received key identification code is located on the access list, the security system 102 may be disarmed. Once the system 102 is disarmed, the machine is enabled to operate, as when the system 102 is deactivated. Disarming the system 102 is similar to deactivating the system 102. The difference being that the system 102 may be disarmed based upon performing and satisfying all the security measures of the system 102, such as key identification code verification. However, the security system 102 may be deactivated for example, without checking for an authorized key identification code, for example. Once the system 102 is deactivated or disarmed, the system 102 operates the same, e.g., the machine is enabled to start. Therefore, in one embodiment, the system 102 is initially activated. The system 102 may be either deactivated or remain activated in response to a first operating characteristic. If the system remains activated, the system 102 may later be disarmed. In an alternative embodiment, the system may be referred to simply as being activated or deactivated, or machine operation may be referred to as enabled or disabled. Therefore, in one embodiment, the seventh control block 320 may be the same as the fourth control block 312 since the machine is enabled to operate once control reaches these procedures.

In an alternative embodiment, the security system 102 may be initialized in a deactivated state upon power up, and then the first operating characteristic may be determined, as before in the third control block 306. The security system 102 may then remain deactivated if the operating characteristic satisfies the system activation period, or may be activated if the operating characteristic is within the system activation period.

Figure 2:
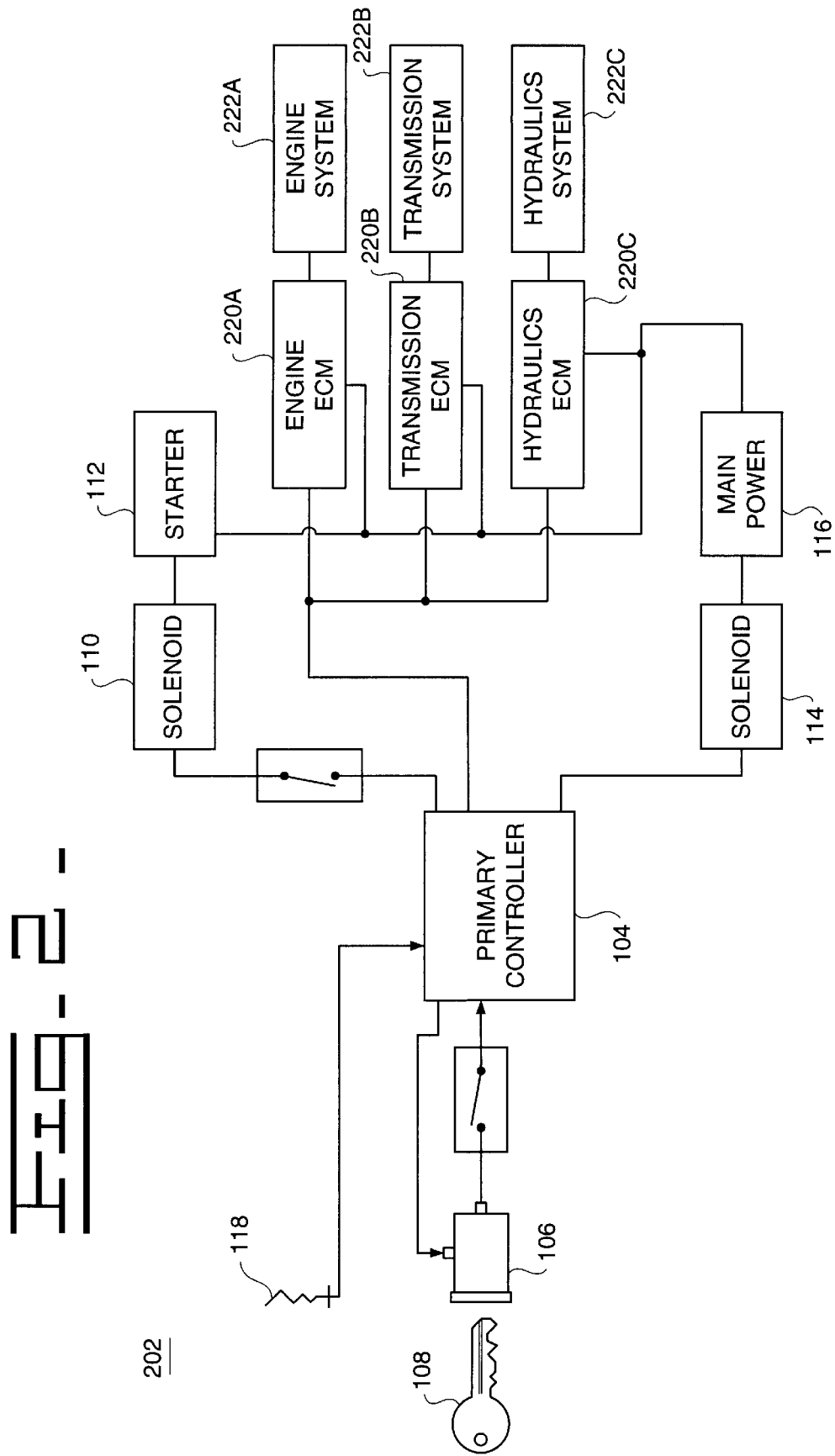
FIG. 2 is an illustration of an alternative embodiment of a machine security system.

In one embodiment, the machine security system 202 includes at least one secondary controller 220, as illustrated in FIG. 2. A secondary controller 220 may be responsible for controlling one or more machine elements, functions, or systems 222. For example an engine controller 220a may control the engine/fuel system 222a, a transmission controller 220b may control the transmission system 222b and/or a hydraulic system controller 220c may control the hydraulic system 222c. In the preferred embodiment, when a secondary controller 220 receives power, the controller initializes itself in a manner that the security measures it is responsible for are activated. For example, in one embodiment, when the engine controller 220a powers up, the security system 102 is active, and no commands, such as fuel injection commands, are delivered to the engine system 222a.

Therefore, the engine may not start because the engine controller 220a has effectively disabled the engine by not delivering any commands to the engine system 222a.

Figure 4:
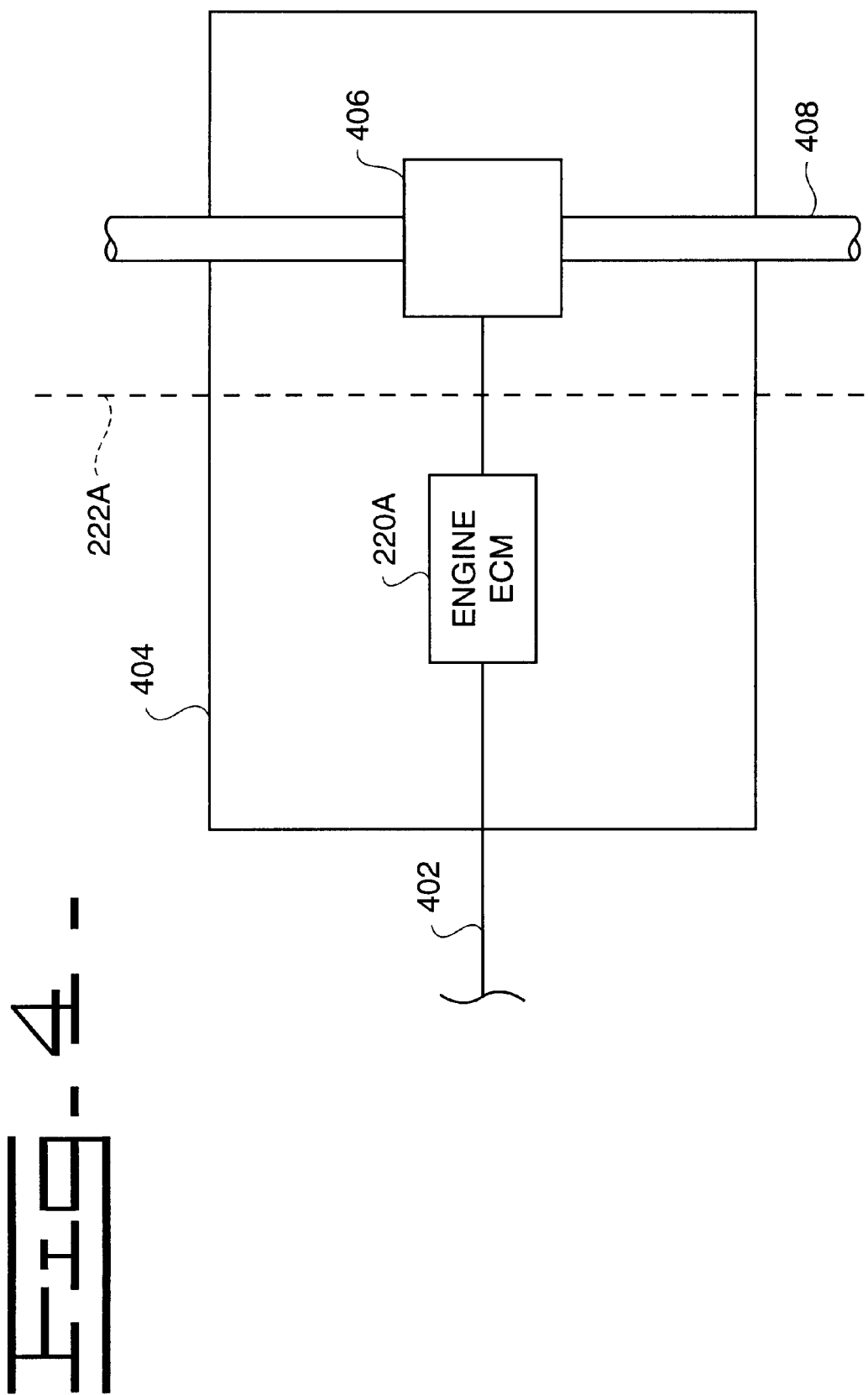
FIG. 4 is an illustration of one embodiment of a secondary controller and an associated machine element or system.

In one embodiment, a secondary controller 220 and all or part of a particular system/function/element 222 may be enclosed in a secure, tamper resistant encasement. For example, FIG. 4 illustrates one embodiment of an encased controller (secondary controller) 220 connected to a relay, or solenoid 406 of an engine system 222a. The controller 220 and solenoid 406 may be contained within a secure casing, or shielding 404 such that they may not be tampered with. In one embodiment, the normal state of the solenoid 406, is a closed state, i.e. a state preventing fuel to flow through the fuel line 408. The fuel line 408 may be encased in a protective or tamper resistant shielding. Upon receiving power the controller 220 begins communicating with the primary controller across data line 402. Upon receiving a signal from the primary controller 202 indicating to enable operation of the machine, the controller 220 may command the solenoid 406 to an open state, enabling fuel to flow through the fuel line 408. Alternative embodiments may be provided to enable a controller 220 to prevent the operation of the machine, e.g., starting of the engine, such as disabling a fuel pump etc.

In alternative, or supplemental embodiments, secure, tamper resistant encasement may be used, as described above, for the engine, transmission, and/or implement controllers 220, and the associated system/function/element 222.

Analogously, the transmission system 222b may be prevented from operating because the security measures associated with the transmission controller 220B, which are activated upon power up, will not enable any commands to be sent to the transmission system 222b, such as commands to fill the clutches (not shown) to enable changing of the gears (not shown). In one embodiment, the security measures associated with the hydraulic controller 220C, also activated upon power up, will not enable any commands be delivered to the fluid pumps (not shown) to pump fluid, or the valves to open from a closed position. Therefore, the hydraulically controlled implements (not shown) may not be operated.

Once powered up, the secondary controller 220 will poll the primary controller 104 to determine the activation status of the overall security system 102. For example, whether the security system 102 is activated or deactivated or disarmed. The primary controller 104 receives the request for status, and delivers an encrypted security system status message to the polling secondary controller 220.

The secondary controller 220 decodes the encrypted message to determine whether to enable the machine system/function/element. The message is indicative of whether to enable machine operation. In one embodiment, the message may be indicative of the status of the security system 102. If the security system 102 is activated then the security measures associated with secondary controller 220 will remain activated, thereby preventing operation of the system/function/element that the secondary controller 220 is responsible for. However, if the encrypted message indicates that the security system is deactivated, or disarmed, then the security measures the secondary controller 220 is associated with are deactivated, enabling operation of the associate system/function/element. For example, in one embodiment, upon determining the security system 102 is deactivated or disarmed, the engine controller 220a will begin monitoring the desired speed, e.g., throttle commands, and the actual speed, which may be initially zero, to determine, among other issues, the appropriate fuel commands to deliver to the injectors (not shown) to achieve the desired speed. Alternatively, or in conjunction with delivering fuel commands, the secondary controller 220 may enable fuel to flow in the fuel line 408, illustrated in FIG. 4. Therefore, operation of the machine system/function/element may be enabled when the secondary controllers determine the security system 102 is deactivated or disarmed.

In an alternative embodiment, the primary controller 104 may include the responsibilities of one or more of the secondary controllers 220. For example, if an engine controller 220 was not included in the embodiment, then the primary controller 104 may control the engine system 222 directly. Therefore, the primary controller 104 would prevent operation of the engine system 222 until all of the appropriate security measures were satisfied.

In the preferred embodiment, enabling machine operation includes enabling the engine of the machine to start and run. That is, if the appropriate security measures are satisfied, the machine engine is enabled to start. As discussed, machine operation may also include control of the transmission system 222b and hydraulic system 222c. In addition, machine operation may refer to the transmission system 222b or hydraulic system 222c alone. For example, in one embodiment, the machine engine may be started without any security measures, when the key switch 106 is configured in a predetermined position. However, the security system 102 may be used to control useage of the transmission and/or hydraulic systems 222b, 222c by locking out, or disabling these systems, as discussed, until the appropriate security measures are satisfied.

Alternative methods of enabling machine operation once the security system 102 is activated, may be available. In one embodiment, a key with no identification code, or a key code that is not on the authorized key list may disarm the security system 102, i.e., enable operation of the machine, when the appropriate procedures are performed. For example, the key 108 and associated key switch 106 may be cycled a predetermined number of times. Once the appropriate number of cycles are achieved, a security system light, e.g., located on the dashboard of the machine, may flash. The system 102 may then be disarmed using a security code. For example, once the light has flashed the number of times corresponding to the first character of the security code, the user may cycle the key 108 once. The light will then continue to flash. The user repeats this for each character of the security code. After the last character has been entered properly, the security system 102 will be disarmed and the machine may be started. In addition, the primary controller 104 may have an unswitched connection (not shown) to the power source 116. The primary controller 104 relies on an initial connection to the power source via the key switch 106. Once the primary controller 104 is operating, the unswitched connection may be utilized to maintain power for a period of time, e.g., ten seconds, after the key 108 has been removed and the associated switched connection to power opened.

In addition, authorized key codes may be added, deleted and/or modified in several ways. In one embodiment, a service tool may be connected to the machine, and in particular to the primary controller 104 of the security system 102. If the user of the service tool has master user privileges, e.g., master password, they may configure the authorized key code(s). For example, if the authorized codes are stored in an access list, the user, having master user privileges, may configure the access key list as desired, e.g., add/delete identification codes and associated key activation periods or modify the system activation period. Alternatively, the machine may be connected to a remote data facility through a communication path such as a satellite connection. A user located at the remote data facility may deliver a message, including secure password, to the primary controller 104. The message may contain modifications to the system activation period, access key list, or a completely new list. Alternative forms of communication may be available with a remote data facility, such as a land based network, satellite data link, or cellular network.

In an alternative embodiment, the master key 108 may be inserted into the key switch 106 and cycled a predetermined number of times. The primary controller 104, utilizing the method described above, will identify the key as a master key. In addition, the primary controller 104 will detect the master key cycling the key switch 106 a predetermined number of times. After cycling the key switch 106 the predetermined number of times, the next key identification code that is received will be stored in the primary controller 104, if the code is not already there. For example, the master key 106 may be removed and another electronic key may be inserted. The identification code of the electronic key will be received and added to the access key list.

In one embodiment, the information regarding system activation period and access key list may be stored at a remote data facility (not shown). In this embodiment, when the primary controller 104 receives power, communication is established with the remote data facility to perform the security measures and checks described above. For example, once the primary controller 104 receives power, the controller 104 would communicate with the remote data facility to establish the system activation period. If the first operating characteristic, for example, was within the system activation period, then the security system 102 remains activated. The primary controller 104 may then receive the key identification code, and through communication with the remote data facility determine if the key code is on the access list and the second operating characteristic, for example, is within the key activation period.

In the preferred embodiment, both a system activation period, and a key identification code are analyzed, as described above, to determine whether to enable operation of the machine. In an alternative embodiment, an analysis of a system activation period may be omitted, and therefore machine operation will be based upon the key identification code analysis. For example, in one embodiment, power is delivered to the primary controller in response to the key switch being configured in a predetermined position, the security system is activated in response to the power delivery, an identification code is received from the key, the received identification code is compared to at least one authorized key identification codes, a determination is made regarding whether to enable machine operation in response to the key code comparison.

INDUSTRIAL APPLICABILITY

The present invention includes a method and apparatus to secure a machine having a machine security system. The machine security system includes a primary controller, and a key switch associated with the primary controller. The key switch is adapted to receive a key, and is configurable to a plurality of positions. The method includes the steps of delivering power to the primary controller in response to the key switch being configured in a predetermined position, activating the security system in response to the power delivery, determining a first operating characteristic of the machine, determining whether to maintain activation of the security system in response to the first operating characteristic, receiving an identification code from the key, and determining whether to enable operation of the machine in response to the received key code. In the preferred embodiment the key switch is adapted to receive a universal key which may be either an electronic key or a non-electronic key. In the preferred embodiment, once the security system is activated, upon receiving power, the first operating characteristic, e.g., time of day, is compared with a system activation time to determine whether to maintain system activation. If the operating characteristic is outside the system activation period, then the security system is deactivated and may be started using either an electronic or non-electronic key. If the security system remains activated, then a key identification code is received from the key and compared with one or more authorized key codes. The authorized key codes may be stored on an access list located in the primary controller 104. The access list includes at least one key identification code. In the preferred embodiment, the access list also includes a key activation period. The primary controller may establish a second operating characteristic, e.g., time of day or service hours, etc., and compare the second operating characteristic with the key activation period. If the key identification code matches a code on the access list, and the criteria for the associated key activation period is satisfied, then machine operation will be enabled. In one embodiment enable signals are delivered to the appropriate devices, such as a starter or a secondary controller, such as an engine controller, to enable the devices to operate a machine system/function/element, thereby enabling operating of the machine.

Other aspects, objects and advantages of the present invention can be obtained from a study of the drawings, the disclosure and the appended claims.

What is claimed is:

1. A method of securing a machine having a machine security system, the machine security system including, a primary controller, a key switch associated with the primary controller and adapted to receive a key, the key switch being configurable to a plurality of positions, comprising the steps of:

delivering power to the primary controller in response to the key switch being configured in a predetermined position;

activating the security system in response to said power delivery;

receiving an identification code from said key in response to said security system being active;

comparing said received identification code to at least one authorized key identification code, said authorized key code having an associated key activation period;

determining a first operating characteristic of said machine;

comparing said first operating characteristic with said key activation period; and disarming said machine security system in response to an access key list including said received identification code, and said first operating characteristic being within said key activation period.

2. A method, as set forth in claim 1, further including the steps of:

determining a second operating characteristic of the machine in response to activation of said security system; and determining whether to maintain activation of said security system in response said second operating characteristic.

3. A method, as set forth in claim 2, wherein each security system has an associated system activation period, and wherein the step of determining whether to maintain activation of said security system in response to said first operating characteristic further includes the step of determining whether said first operating characteristic is compatible with said system activation period.

4. A method, as set forth in claim 3, wherein said first operating characteristic is a reference time, and the step of determining whether said first operating characteristic is compatible includes the step of determining whether said first operating characteristic is within said system activation period.

5. A method, as set forth in claim 4, wherein the step of determining whether to maintain activation of said security system includes the step of enabling said machine operation in response to said first operating characteristic is within said system activation period.

6. A method of securing an machine having a machine security system, the machine security system including, a primary controller, a key switch associated with the primary controller and adapted to receive a key, the key switch being configurable to a plurality of positions, comprising the steps of:

delivering power to the primary controller in response to the key switch being configured in a predetermined position;

activating the security system in response to said power delivery;

determining a first operating characteristic of the machine;

determining whether to maintain activation of said security system in response to said first operating characteristic;

receiving an identification code from said key;

comparing said received identification code to at least one authorized key identification code;

determining whether to enable operation of said machine in response to said code comparison.

7. A method, as set forth in claim 6, further comprising the step of enabling said machine to operate in response to said machine security system being one of deactivated and disarmed.

8. A method, as set forth in claim 7, wherein the step of determining whether to enable operation of said machine further comprises the step of disarming the machine security system in response to said received identification code being located on said access list.

9. A method, as set forth in claim 8, wherein the step of determining whether to maintain activation of said security system in response to said first operating characteristic further includes the step of determining whether said first operating characteristic is compatible with a system activation period.

10. A method, as set forth in claim 9, wherein said first operating characteristic is a reference time, and the step of determining whether said first operating characteristic is compatible includes the step of determining whether said first operating characteristic is within said system activation period.

11. A method, as set forth in claim 10, wherein the step of determining whether to maintain activation of said security system includes the step of enabling said machine operation in response to said first operating characteristic is within said system activation period.

12. A method, as set forth in claim 11, wherein the machine security system includes at least one secondary controller, wherein the step of enabling said machine to operate further comprises the steps of:

receiving a polling request from said at least one secondary controller, said secondary controller controlling a machine function;

delivering an encrypted message to said at least one secondary controller;

enabling a machine function, in response to said encrypted message.

13. A method, as set forth in claim 12, wherein said access list is located on a remote data facility.

14. A method, as set forth in claim 13, wherein the step of comparing said received identification code to an access list further comprises the steps of:

communicating said received identification code to a remote data facility; and, receiving from said remote data facility a signal indicative of said comparison.

15. A method, as set forth in claim 14, wherein the step of determining whether to maintain activation of said security system in response to said first operating characteristic includes the steps of:

communicating said first operating characteristic to said remote data facility; and, receiving from said remote data facility an activation signal indicative of whether activation of said security system should be maintained.

16. A method, as set forth in claim 11, further comprising the step of enabling said machine to start with one of a non-electronic key and an electronic key in response to said security system being deactivated.

17. A method, as set forth in claim 6, wherein each said authorized key identification code has an associated key activation period, and wherein the step of determining whether to enable operation of said machine in response to said code comparison further comprises the steps of:

establishing a second operating characteristic of said machine;

comparing said second operating characteristic with said key activation period; and enabling said machine operation in response to said received identification code matching at least one of said at least one authorized codes, and said second operating characteristic being within said key activation period of said matched key.

18. A method, as set forth in claim 17, wherein the step of receiving said identification code further comprises the step of polling said key in response to said security system remaining active.

19. A method, as set forth in claim 18, wherein the step of comparing said received identification code further comprises the step of verifying said received identification code contains valid data.

20. A method, as set forth in claim 6, further comprising the steps of preventing an engine associated with said machine from starting until said security system is one of disarmed and deactivated.

21. A method, as set forth in claim 20, wherein the machine has an associated hydraulic circuit, further comprising the steps of preventing an implement associated with a hydraulic circuit from operating until said security system is one of disarmed and deactivated.

22. A method, as set forth in claim 21, further comprising the steps of preventing an transmission associated with the machine from operating until said security system is one of disarmed and deactivated.

23. A method, as set forth in claim 6, further comprising the step of enabling said machine to start with one of a non-electronic key and an electronic key in response to said security system being deactivated.

24. A method, as set forth in claim 6, wherein said at least one authorized key code is located on at least one of said machine and a remote data facility.

25. An security apparatus adapted to secure an machine, comprising:

a key switch adapted to receive a key, said key switch having a plurality of positions;

a power source for delivering a power signal;

an antenna adapted to receive a key identification code signal, and responsively generate a received key identification signal;

a primary controller adapted to receive said power signal in response to said key switch being configured in a predetermined position, said primary controller adapted to receive said key identification signal, said primary controller including an access list, said access list including at least one key identification code, said primary controller being further adapted to activate the security system in response to receiving said power signal, determine a first operating characteristic of the machine, determine whether to maintain activation of said security system in response to said first operating characteristic, compare said received identification code to said access list, determine whether to maintain activation of said security system in response to said identification code comparison.

26. An apparatus, as set forth in claim 25, further comprising a secondary controller, said secondary controller controlling a function of said machine, wherein said primary controller is further adapted to deliver an enable signal to said secondary controller in response to said security system being one of deactivated and disarmed.

27. An apparatus, as set forth in claim 26, wherein said access list further comprises a key activation period associated with each of said key identification codes, wherein said primary controller is further adapted to establish a second operating characteristic of the machine, and compare said second operating characteristic with said key activation period and determine whether to maintain activation of said security system in response to said identification code comparison and said key activation period comparison.

28. An apparatus, as set forth in claim 25, further comprising a starter system, wherein said primary controller is further adapted to deliver an enable signal to said starter system in response to said security system being one of deactivated and disarmed.

29. A method of securing an machine having a machine security system, the machine security system including, a primary controller, a key switch associated with the primary controller and adapted to receive a key, the key switch being configurable to a plurality of positions, comprising the steps of:

delivering power to the primary controller in response to the key switch being configured in a predetermined position;

determining a first operating characteristic of the machine;

determining whether to enable operation of said machine in response to said first operating characteristic;

receiving an identification code from said key in response to said machine operation remaining disabled; and determining whether to enable operation of said machine in response to said received identification code.

30. A method, as set forth in claim 29, wherein the step of determining whether to enable operation of said machine in response to said received identification code further comprises the steps of:
- comparing said received identification code to at least one authorized key code; and
- determining whether to enable operation of said machine in response to said comparison.

31. A method, as set forth in claim 30, wherein said machine operation remains disabled upon said power delivery.

32. A method, as set forth in claim 30, wherein each said key identification code in said access list has an associated key activation period, and wherein the step of determining whether to enable said machine in response to said comparison of said identification code and said access list further comprises the steps of:
- establishing a second operating characteristic of said machine;
- comparing said second operating characteristic with said key activation period; and
- enabling said machine operation in response to said key list including said received identification code, and said second operating characteristic being within said key activation period.

33. A method, as set forth in claim 32, wherein each security system has an associated system activation period, and wherein the step of determining whether to maintain activation of said security system in response to said first operating characteristic further includes the step of determining whether said first operating characteristic is compatible with said system activation period.

34. A method, as set forth in claim 33, wherein said first operating characteristic is a reference time, and the step of determining whether said first operating characteristic is compatible includes the step of determining whether said first operating characteristic is within said system activation period.

35. A method, as set forth in claim 34, wherein the step of determining whether to maintain activation of said security system includes the step of enabling said machine operation in response to said first operating characteristic is within said system activation period.

36. A method, as set forth in claim 35, wherein the step of receiving said identification code further comprises the step of polling said key in response to said security system remaining active.

37. A method, as set forth in claim 36, wherein the machine security system includes at least one secondary controller, wherein the step of enabling said machine to operate further comprises the steps of:
- delivering an enable signal to said secondary controller; and
- herein said secondary controller enables a machine element in response to said enable signal.

38. A method of securing an machine having a machine security system, the machine security system including, a primary controller, a key switch associated with the primary controller and adapted to receive a key, the key switch being configurable to a plurality of positions, comprising the steps of:
- delivering power to the primary controller in response to the key switch being configured in a predetermined position;
- determining a first operating characteristic of the machine;
- activating said security system in response to said first operating characteristic;
- receiving an identification code from said key in response to said security system being activated;
- comparing said received identification code to an access list, said access list including at least one key identification code;
- determining whether to maintain activation of said security system in response to said comparison.

* * * * *